US012808359B2

(12) United States Patent
Meek et al.

(10) Patent No.: US 12,808,359 B2
(45) Date of Patent: Nov. 24, 2026

(54) ELECTROMAGNETIC PUMPS AND METHODS OF OPERATING THE SAME WITH IMPROVED COOLING

(71) Applicant: GE-Hitachi Nuclear Energy Americas LLC, Wilmington, NC (US)

(72) Inventors: Oscar L. Meek, Wilmington, NC (US); Nikolas Davis, Tulsa, OK (US); Mohammed Shutayfi, Durham, NC (US)

(73) Assignee: GE-Hitachi Nuclear Energy Americas LLC, Wilmington, NC (US)

(*) Notice: Subject to any disclaimer, the term of this patent is extended or adjusted under 35 U.S.C. 154(b) by 398 days.

(21) Appl. No.: 18/428,629

(22) Filed: Jan. 31, 2024

(65) Prior Publication Data

US 2025/0243852 A1 Jul. 31, 2025

(51) Int. Cl.
*F04B 15/04* (2006.01)
*G21C 15/247* (2006.01)
(Continued)

(52) U.S. Cl.
CPC ............ *F04B 15/04* (2013.01); *G21C 15/247* (2013.01); *G21D 1/04* (2013.01); *H02K 5/20* (2013.01);
(Continued)

(58) Field of Classification Search
CPC ...................... G21C 15/243–247; H02K 44/06
See application file for complete search history.

(56) References Cited

U.S. PATENT DOCUMENTS 3,885,890 A * 5/1975 Davidson ............... H02K 44/06 417/50
4,166,714 A * 9/1979 Rienass .................. H02K 44/06 417/50
(Continued)

FOREIGN PATENT DOCUMENTS

CN 2753901 Y * 1/2006
CN 117543856 A * 2/2024 ............... H02K 1/22
(Continued)

OTHER PUBLICATIONS

Triplett et al. "Prism: A Competitive Small Modular Sodium-Cooled Reactor," J. of Nuclear Tech., vol. 178, May 2012.
(Continued)

*Primary Examiner* — Laert Dounis
(74) *Attorney, Agent, or Firm* — Alley IP

(57) ABSTRACT

Electromagnetic pumps pump coolant through plural paths in the pump with magnetic fields. The paths are next to components that overheat, so as to pull heat from the same into the coolant fluid being pumped. The paths may run at different or opposite dimensions of the components, to provide unique heat sinking paths and reduce temperature gradients and excursions in the components. Paths may be nested annuli, loops, or entirely distinct vertical passages around the components. Electromagnetic pumps may be used in nuclear power plants to drive magnetic fluids. The pumps may operate immersed in melted metals at several hundred degrees Celsius in an operating reactor without overheating or degradation of their electrical and insulating components.

16 Claims, 5 Drawing Sheets

(51) Int. Cl.

| | |
|---|---|
| ***G21D 1/04*** | (2006.01) |
| ***H02K 5/20*** | (2006.01) |
| ***H02K 44/02*** | (2006.01) |
| ***H02K 44/06*** | (2006.01) |

(52) U.S. Cl.
CPC ............. *H02K 44/02* (2013.01); *H02K 44/06* (2013.01); *Y02E 30/30* (2013.01)

(56) References Cited

U.S. PATENT DOCUMENTS

| | | | | |
|---|---|---|---|---|
| 5,094,803 A | | 3/1992 | Nishiguchi | |
| 5,195,231 A | | 3/1993 | Fanning et al. | |
| 5,265,136 A | * | 11/1993 | Yamazaki ............. | G21C 15/18 376/361 |
| 5,440,600 A | | 8/1995 | Fanning | |
| 8,711,997 B2 | | 4/2014 | Yokoyama et al. | |
| 9,881,700 B2 | | 1/2018 | LeBlanc | |

FOREIGN PATENT DOCUMENTS

| | | | | | |
|---|---|---|---|---|---|
| JP | 59002563 | A | * | 1/1984 | |
| JP | 62-217853 | | | 3/1986 | |
| JP | 62-178153 | | | 8/1987 | |
| JP | 62217853 | A | * | 9/1987 | |
| JP | 04-164294 | | | 6/1992 | |
| JP | 04164294 | A | * | 6/1992 | |
| JP | 06086532 | A | * | 3/1994 | |
| JP | 11-030686 | | | 2/1999 | |
| WO | WO-2012053215 | A1 | * | 4/2012 | ............. G21D 1/006 |

OTHER PUBLICATIONS

Loewen et al., "Next-Generation Electromagnetic Pump Analysis Tools" Oct. 29, 2015.
Kosuke Aizawa et al., "Electromagnetic Pumps for Main Cooling Systems of Commercialized Sodium-Cooled Fast Reactor" Journal of Nuclear Science and Technology, vol. 48, 2011.
WIPO, International Search Report in corresponding PCT Application PCT/US2025/013641, May 29, 2025.
WIPO, Written Opinion in corresponding PCT Application PCT/US2025/013641, May 29, 2025.

* cited by examiner

ELECTROMAGNETIC PUMPS AND METHODS OF OPERATING THE SAME WITH IMPROVED COOLING

BACKGROUND

FIG. 1 is a schematic of a nuclear reactor that uses an electromagnetic pump, such as a PRISM reactor. Electromagnetic pumps drive a magnetic coolant, such as a liquid sodium coolant, through various reactor portions to provide heat transfer for reactor safety and industrial applications such as electricity generation. Arrows in FIG. 1 show how such a coolant may move through a PRISM reactor.

As shown in FIG. 1, reactor vessel 10 includes nuclear core 1 generating heat through fission and transferring the same to liquid sodium coolant 90. Core 1 receives colder coolant 90 from inlet plenum 15 and heats the same. Heated coolant 90 then flows through one or more heat exchangers 20 for energy extraction and is returned to core 1 cooler. One or more electromagnetic pumps 50 may drive this coolant circulation loop by receiving coolant 90 through inlet manifold 52 and driving the coolant out through discharge pipe 51, where coolant 90 feeds back into core 1 through inlet plenum 15.

Electromagnetic pumps 50 may be partially to fully immersed in the coolant. As shown in FIG. 1, heated coolant may have a highest level at level 92 and a coldest drawdown level at level 91 within liner 11 of vessel 10. Both levels 91 and 92 may be well above electromagnetic pumps 50. An access port providing power and access to pumps 50 may extend at a top of vessel 10, and containment 12 may surround all of vessel 10. Additional details of PRISM reactor operation are given in Triplett et al. "PRISM: A Competitive Small Modular Sodium-Cooled Reactor," J. of Nuclear Tech., Vol. 178, May 2012, incorporated by reference herein in its entirety. Operation of some electromagnetic pumps for liquid metal reactors is described in Loewen et al., "Next-Generation Electromagnetic Pump Analysis Tools" Oct. 29, 2015, incorporated by reference herein in its entirety.

This background provides a useful baseline or starting point from which to better understand some example embodiments discussed below. Except for any clearly-identified third-party subject matter, likely separately submitted, this Background and any figures are by the Inventor(s), created for purposes of this application. Nothing in this application is necessarily known or represented as prior art.

SUMMARY

Example embodiments include electromagnetic pumps that circulate coolant, potentially while being immersed in the coolant. Example embodiments may use multiple channels, or at least a primary and secondary channel, for pushing the coolant through the pump with magnetic fields. As electrical components, such as coils and circuits used to develop the magnetic fields, heat up in operation, this heat may be sunk to these multiple channels selectively positioned at different, potentially opposite, sides or surrounding the electrical components. While the electrical components may be electrically insulated from each other, the coolant, and even the remainder of the pump, they may thus be in thermal communication with the coolant in multiple directions through these multiple channels. This may prevent hot spots or insulated heat spiking and extreme temperature gradients in both the electrical components and their insulation, extending their life and functionality while permitting full pump operation.

Example embodiment pumps may arrange their multiple coolant channels in several different ways to pull and provide coolant from/to any desired sources and destinations. For example, multiple ringed channels may be concentric about and axial directions of the pump with a shared inlet source and output. Or the channels may form loops flowing into one another such as U-shaped channels with the heat sunk components in thermal communication with both sides of the U. Or the channels may be separate, entering and exiting on different sides of the pump and potentially from different sources, while passing on multiple sides of the electrical components.

Example embodiment pumps may be used in challenging, high-temperature environments such as nuclear power plants using liquid metal coolants. The pumps may induce magnetic fields throughout their coolant channels to drive the coolant in the plant while simultaneously transferring heat from their electrical components from multiple sides to the coolant in these channels. The pumps may operate immersed in melted metals at several hundred degrees Celsius in an operating nuclear reactor environment without overheating or degradation of their electrical and insulating components.

BRIEF DESCRIPTIONS OF THE DRAWINGS

Example embodiments will become more apparent by describing, in detail, the attached drawings, wherein similar elements are represented by similar reference numerals. The drawings serve purposes of illustration only and thus do not limit example embodiments herein. Elements in these drawings may be to scale with one another and exactly depict shapes, positions, operations, and/or wording of example embodiments, or some or all elements may be out of scale or embellished to show alternative proportions and details.

DETAILED DESCRIPTION

Figure 1:
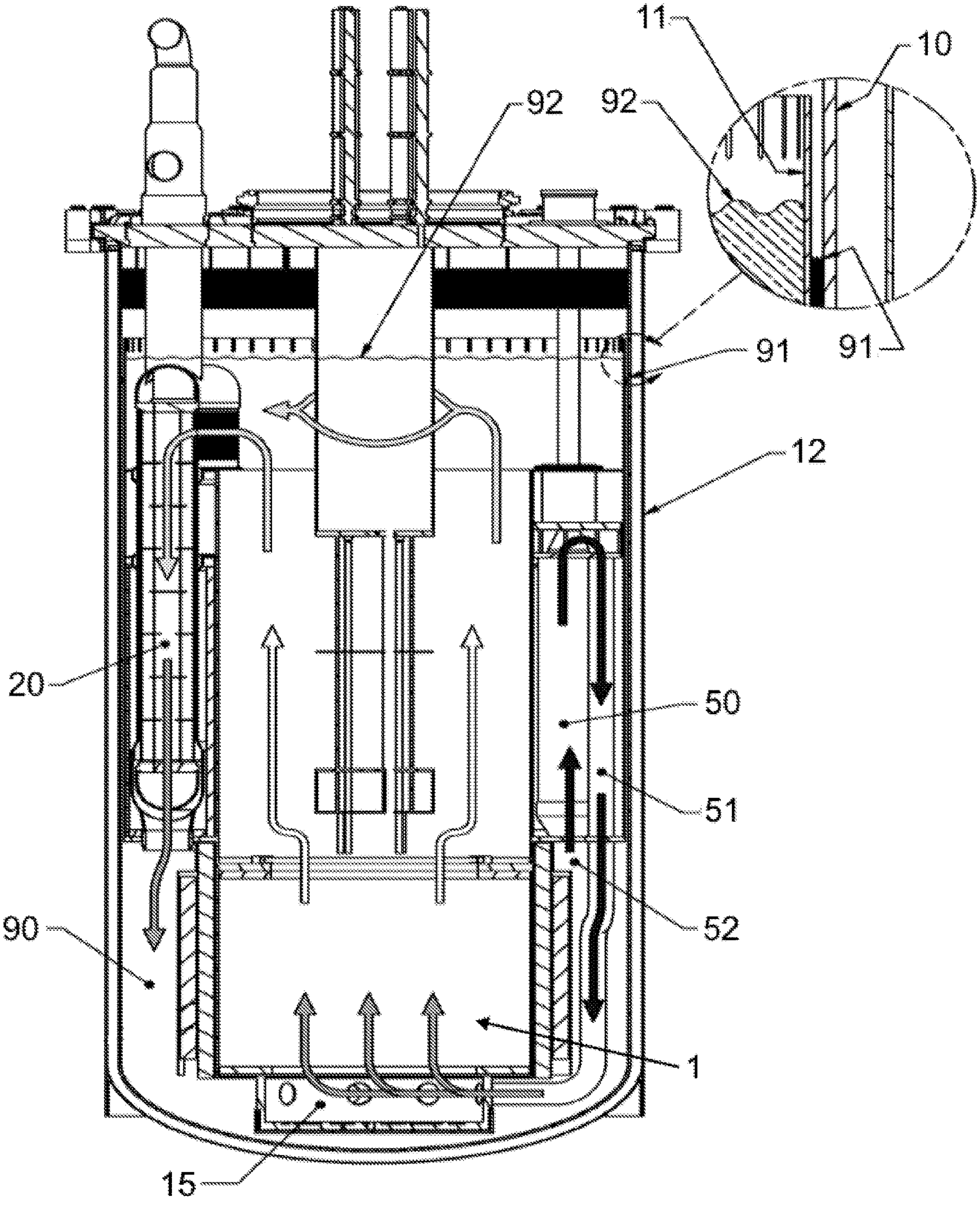
FIG. 1 (Related Art)
FIG. 1 is an illustration of a related art liquid metal cooled nuclear reactor.

Because this is a patent document, general broad rules of construction should be applied when reading it. Everything described and shown in this document is an example of subject matter falling within the scope of the claims, appended below. Any specific structural and functional details disclosed herein are merely for purposes of describing how to make and use examples. Several different embodiments and methods not specifically disclosed herein may fall within the claim scope; as such, the claims may be embodied in many alternate forms and should not be construed as limited to only examples set forth herein.

Membership terms like "comprises," "includes," "has," or "with" reflect the presence of stated features, characteristics, steps, operations, elements, and/or components, but do not themselves preclude the presence or addition of one or more other features, characteristics, steps, operations, elements, components, and/or groups thereof. Rather, exclusive modifiers like “only” or “singular” may preclude presence or addition of other subject matter in modified terms. The use of permissive terms like “may” or “can” reflect optionality such that modified terms are not necessarily present, but absence of permissive terms does not reflect compulsion. In listing items in example embodiments, conjunctions and inclusive terms like “and,” “with,” and “or” include all combinations of one or more of the listed items without exclusion of non-listed items. The use of “etc.” is defined as “et cetera” and indicates the inclusion of all other elements belonging to the same group of the preceding items, in any “and/or” combination(s). Modifiers “first,” “second,” “another,” etc. do not confine modified items to any order. These terms are used only to distinguish one element from another; where there are “second” or higher ordinals, there merely must be that many number of elements, without necessarily any difference or other relationship among those elements.

When an element is related, such as by being “connected,” “coupled,” “on,” “attached,” “fixed,” etc., to another element, it can be directly connected to the other element, or intervening elements may be present. In contrast, when an element is referred to as being “directly connected,” “directly coupled,” etc. to another element, there are no intervening elements present. Other words used to describe the relationship between elements should be interpreted in a like fashion (e.g., “between” versus “directly between,” “adjacent” versus “directly adjacent,” etc.).

As used herein, singular forms like “a,” “an,” and “the” are intended to include both the singular and plural forms, unless the language explicitly indicates otherwise. Indefinite articles like “a” and “an” introduce or refer to any modified term, both previously-introduced and not, while definite articles like “the” refer to the same previously-introduced term. Relative terms such as “almost” or “more” and terms of degree such as “approximately” or “substantially” reflect 10% variance in modified values or, where understood by the skilled artisan in the technological context, the full range of imprecision that still achieves functionality of modified terms. Precision and non-variance are expressed by contrary terms like “exactly.”

As used herein, “axial” and “vertical” directions are the same up or down directions oriented along the major axis of a nuclear reactor, often in a direction oriented with gravity. “Transverse” directions are perpendicular to the “axial” and are side-to-side directions at a particular axial height, whereas “radial” is a specific transverse direction extending perpendicular to and directly away from the major axis of the nuclear reactor.

The structures and operations discussed below may occur out of the order described and/or noted in the figures. For example, two operations and/or figures shown in succession may in fact be executed concurrently or may be executed in the reverse order, depending upon the functionality/acts involved. Similarly, individual operations within example methods described below may be executed repetitively, individually or sequentially, so as to provide looping or other series of operations aside from exact operations described below. It should be presumed that any embodiment or method having features and functionality described below, in any workable combination, falls within the scope of example embodiments.

The inventors have recognized that one of the most common failure modes of electromagnetic pumps is material degradation due to excess temperature. Particularly, insulating materials covering electrical components are prone to develop excess heat from the electrical components that they must completely electrically isolate. Yet fluids driven by electromagnetic pumps are not in thermal communication with the insulation on all dimensions. Electromagnetic pumps may require lower operating voltages and currents, and thus less driving power, and/or increased inspection and maintenance, to avoid this newly-recognized problem. But the Inventors have further recognized the electromagnetic pumps in nuclear reactors particularly are difficult to readily access for inspection and maintenance. Thus, there is a need for further heat sinking, particularly from electrical components and insulation for the same, in electromagnetic pumps. To overcome these newly-recognized problems as well as others, the inventors have developed example embodiments and methods described below to address these and other problems recognized by the inventors with unique solutions enabled by example embodiments.

The present invention is electromagnetic pumps and methods of operating the same with improved heat sinking. In contrast to the present invention, the few example embodiments and example methods discussed below illustrate just a subset of the variety of different configurations that can be used as and/or in connection with the present invention.

Figure 2:
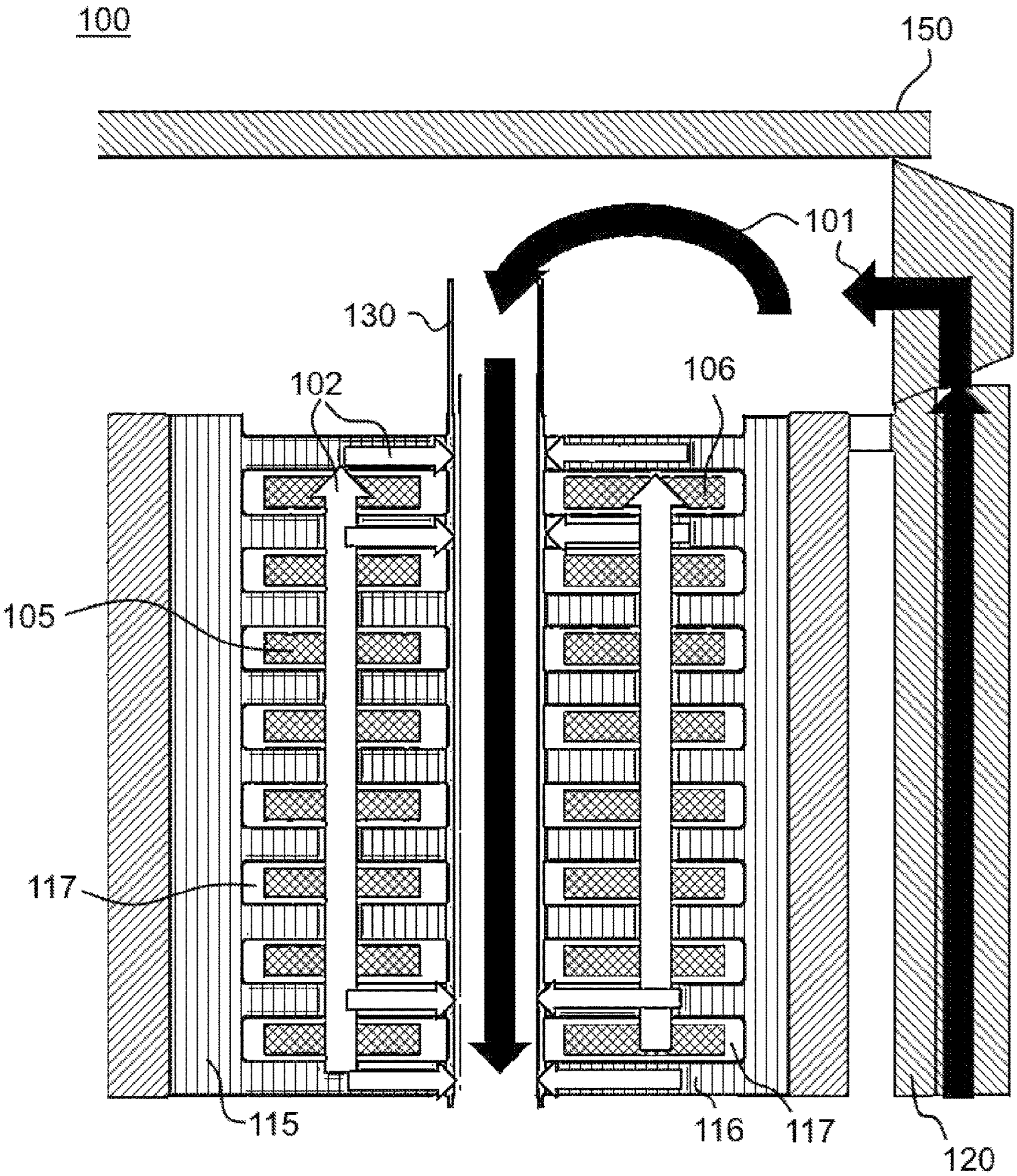
FIG. 2 is an illustration of an example embodiment electromagnetic pump.

FIG. 2 is an illustration of an example embodiment electromagnetic pump 100 useable for pumps 50 in FIG. 1. Example embodiment electromagnetic pump 100 is shown in cross-section with liquid coolant flow being shown by solid block arrows 101 and heat dissipation being shown by hollow white arrows 102. The cross-section shown in FIG. 2 may be about a plane extending axially and radially, with pump 100 being annular and symmetric about a vertical axis generally at the left-hand side of FIG. 2. As shown in FIG. 2, casing 150 may surround and provide an outer surface to pump 100. Casing 150 may be immersible in the liquid coolant at high temperature while remaining intact and directing coolant through pump 100. Inlet manifold 120 may provide a directed passageway separate from casing 150 and thermally isolated from inner components of pump 100, to draw liquid coolant from a coolant cold pool separated from and adjacent to a reactor core. Because inlet manifold 120 may draw coolant in an opposite direction, it may be sufficiently separated from the remainder of pump 100 so as to not be affected by magnetic fields developed therein.

Outer stator 116 and inner stator 115 may be positioned on opposite sides of single coolant output channel 130, or a single stator may be used. Stators 116 and 115 may be nested and capable of providing an electrical field through induction and/or natural ferromagnetism, such as with iron-based materials. A series of inner coils 105 and outer coils 106 may pass through inner stator 115 and outer stator 116 and carry large amounts of electric current to develop magnetic fields in the stators and/or output channel 130. For example, coils 105 and 106 may be copper or another material capable of carrying large currents with low resistance. The resulting magnetic field about coils 105 and 106 may converge in output channel 130 and provide pressure to, and thus drive, a magnetic coolant such as a liquid metal like sodium through channel 130.

Coils 105 and 106 are insulated by electrical insulation 117 from stators 115 and 116, to prevent current loss from coils 105 and 106. While insulation 117 be able to electrically isolate coils 105 and 106 and withstand significant voltages and currents, insulation 117 must also be resilient in an operating nuclear reactor environment. For example, liquid sodium at its coolest in the reactor may enter pump 100 at approximately 355° C., but insulation 117 may rise to approximately 450° C. within pump 100 at full operation due to unavoidable resistances and stray induction. As shown in FIG. 2, heat 102 generated in coils 105 and 106 may move through insulation 117 to single coolant output channel 130 in an upward and inward direction. This elevated temperature and radiation may require frequent inspection and/or replacement of insulation 117 to maintain operation.

Figure 3:
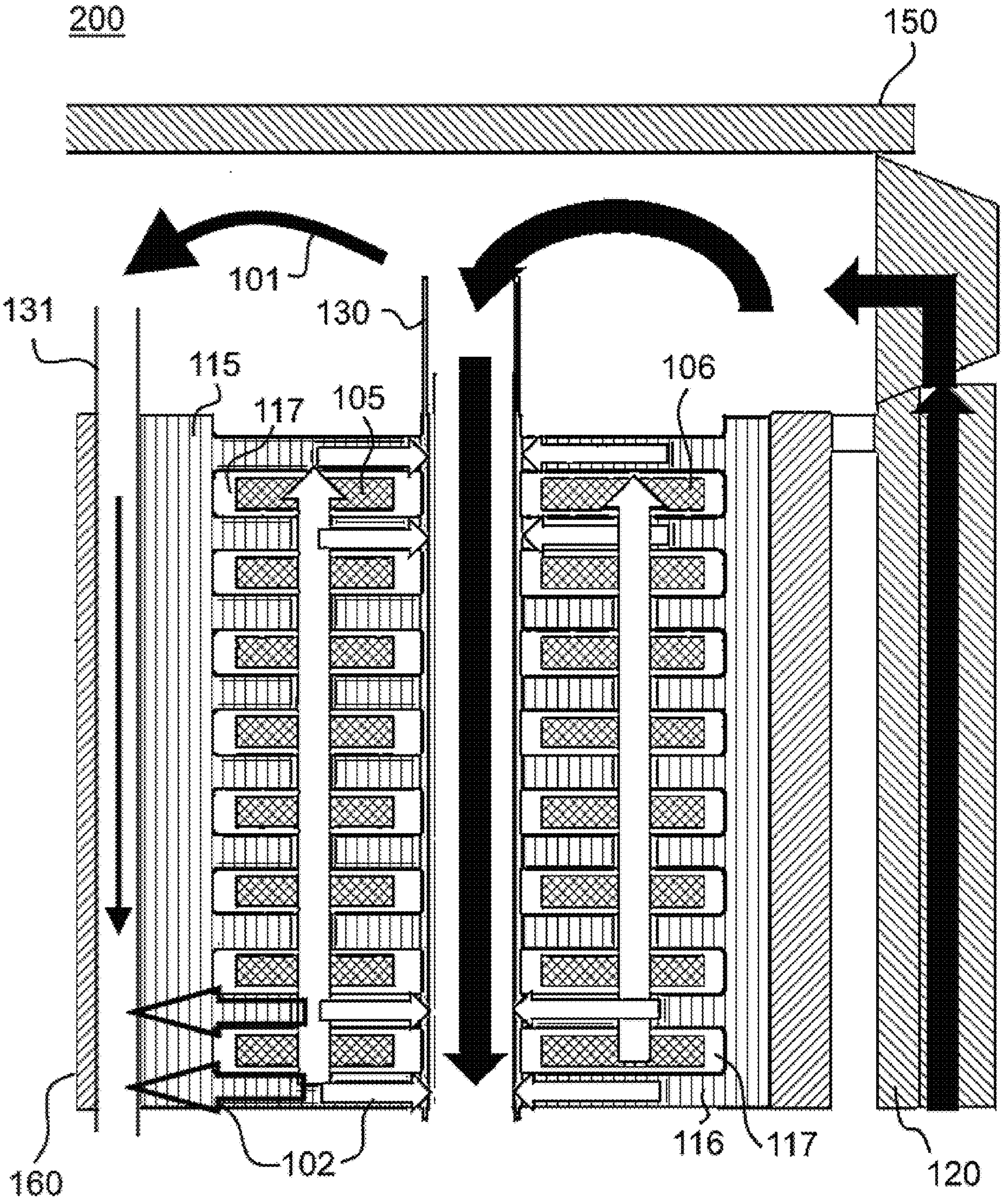
FIG. 3 is an illustration of another example embodiment electromagnetic pump.

FIG. 3 is an illustration of an example embodiment pump 200. FIG. 3 presents an internal cross-section of a pump half in an axial-radial plane, with black arrows 101 indicating coolant drive direction, and white arrows 102 indicating examples of heat transport in pump 200. As shown in FIG. 3, example embodiment pump 200 includes multiple output channels, such as a primary output channel 130 and secondary output channel 131, inside of outer coils 106 and outer stator 116. If dual stators are used, secondary output channel 131 may be further inside inner coils 105 and inner stator 115. Secondary output channel 131 may be an annular passage between an inner divider or casing 160 and inner stator 115 or could be a central cylindrical passage extending all the way to the left axis in FIG. 3. Secondary output channel 131 may be any size, such as an equal or lesser volume to primary output channel 130, and also drive coolant with magnetic fields converging and providing pressure in the same direction as channel 130 from inner coils 105. Channels 130 and 131 may output to any desired destination, such as both driving coolant to inlet plenum 15 (FIG. 1) in a reactor.

Multiple channels 130 and 131, potentially on differing sides of coils 105, provide additional heat transfer and cooling in example embodiment pump 200. As seen in FIG. 3, heat transfer 102 may occur through both sides of inner coils 105, insulation 117, and inner stator 115. Assuming the same 355° C. entry temperature of a liquid sodium coolant 101, multiple channels 130 and 131 reduce the insulation operating temperature by more than approximately 20° C., such as a drop from 437° C. to 415° C. in temperature of insulator 117 closest to secondary flow channel 131, between pumps 100 and 200 at full operation. This temperature reduction and smaller temperature gradient across insulator 117 permitted by multiple coolant channels and multi-directional heat transfer may extend insulator life and performance in an operating nuclear reactor environment, allowing less inspection and maintenance of pump 200 and greater capacity for full-scale operations and coolant driving of pump 200.

Figure 4:
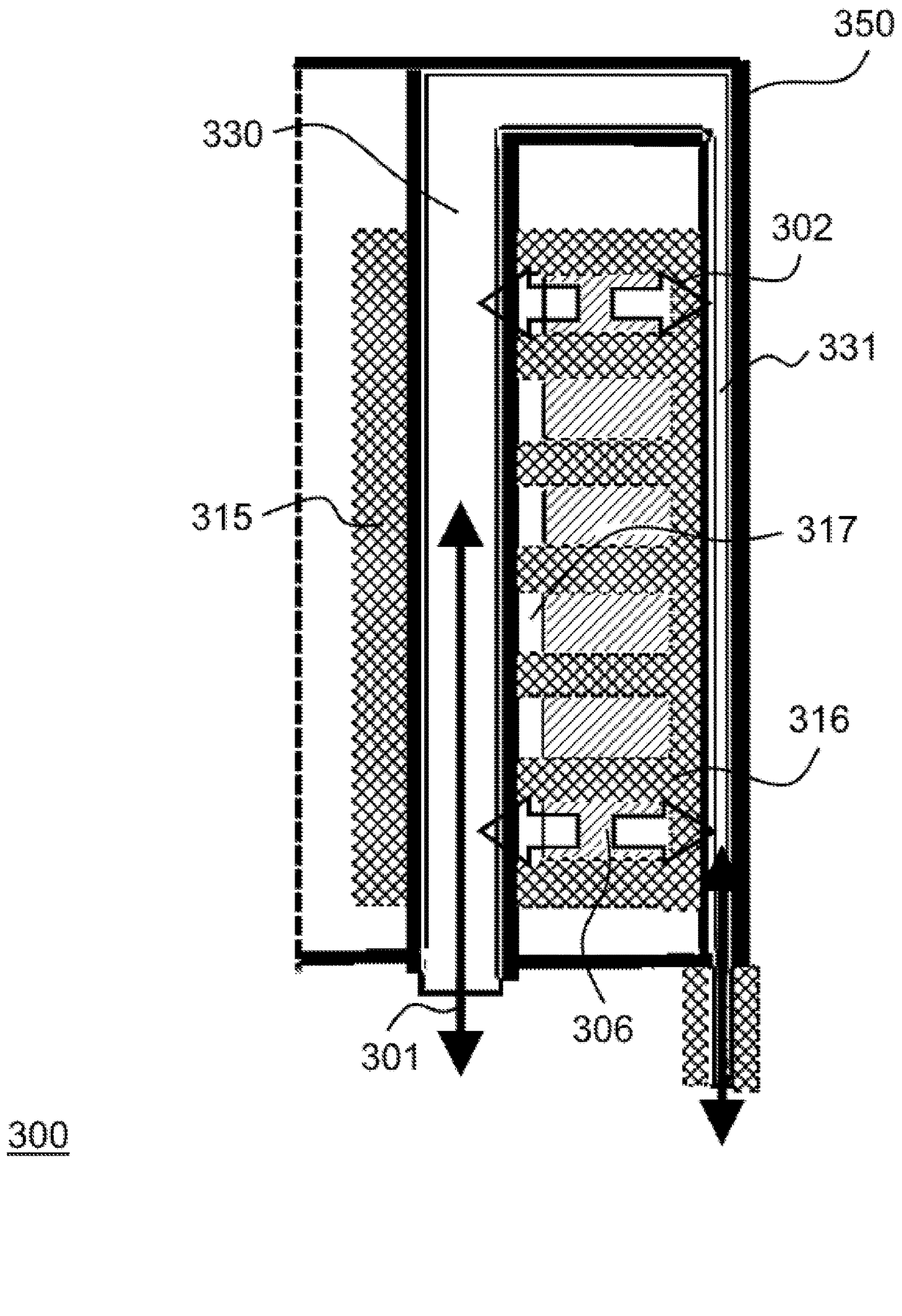
FIG. 4 is an illustration of another example embodiment electromagnetic pump.

Although example embodiment electromagnetic pump 200 in FIG. 3 is shown with secondary coolant channel 131 drawing coolant 101 from a same source as primary coolant channel 130, any sources and destinations may be varied among the multiple coolant channels. FIG. 4 is an illustration of another example embodiment electromagnetic coolant pump 300 showing multiple channels in use. Although FIG. 3 illustrates a double-stator setup and FIG. 4 illustrates a single-stator setup, it is understood that either embodiment could use any number of stators. And like FIG. 3, FIG. 4 shows half of pump 300 in internal cross-section of an axial-radial plane, with black arrows 301 indicating coolant drive direction, and white arrows 302 indicating examples of heat transport in pump 300.

As shown in FIG. 4, primary coolant channel 330 makes a U-turn to return channel 331 around stator 316 and coils 306 therein with insulation 317. For example, primary coolant channel 330 may pull coolant from a cold pool and deliver the coolant via return channel 331 to a plenum at a same lower end. Stator 316 and/or magnetic material 315 may drive coolant 301 under a permanent and/or induced magnetic field. For example, in FIG. 4 coolant may be driven upward in primary coolant channel 330 from a cold pool, and then downward in return channel 331 toward a plenum. These directions of coolant 301 may be reversed depending on coolant sources and destinations. Of course, any other coolant sources and destinations may be used with example embodiment pump 300, depending on location and any other delivery structures attached to channels 330 and 331. For example, return channel 331 could be at an opposite, central position to the left of primary coolant channel 330, potentially on the other side of a dual stator setup.

Because coolant 301 may flow in close proximity to both sides of coils 306, such as if channels 330 and 331 are directly adjacent to stator 316 and/or insulation 317, heat transfer 302 may occur from both ends of coils 306 to coolant 301. This reduces maximum temperature developed in coils 306 and insulation 317 separating coils 306 from stator 316, potentially extending the life and performance of insulation 317 and thus pump 300. Although primary coolant channel 330 may have a larger internal cross section than return channel 331, it is understood that because pump 300 may be symmetric about its vertical axis, these channels may be continuously annular, such that return channel 331 will have an equal or greater flow volume to primary channel 301 due to the larger radii. Return channel 331 may not displace wiring, sensors, or other internals of casing 350 by being positioned against stator 316; rather, any additional components for pump 300 may be positioned inside casing 350 outside of return channel 331 without change in operation or requiring any additional volume in pump 300.

Figure 5:
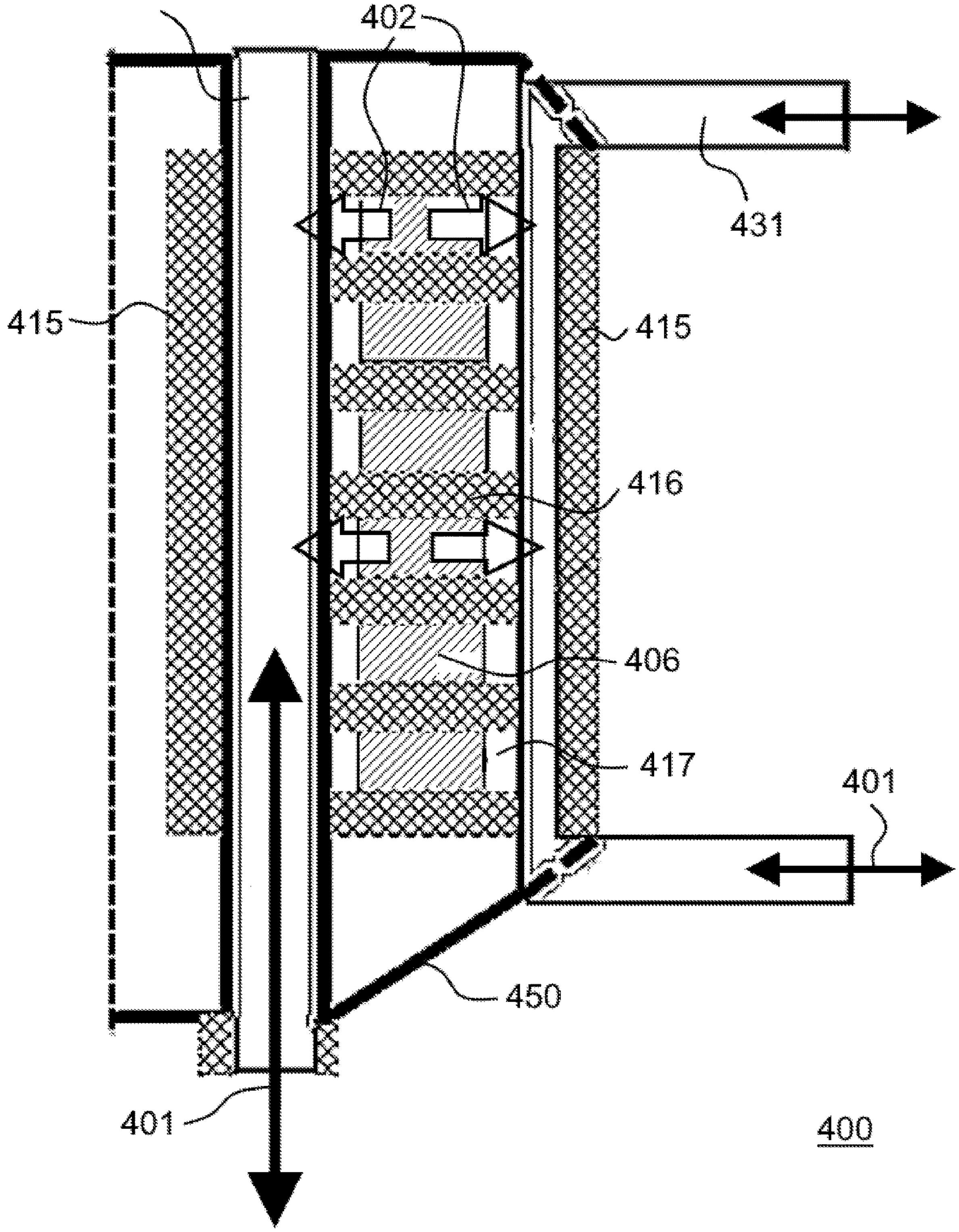
FIG. 5 is an illustration of another example embodiment electromagnetic pump.

Another example embodiment electromagnetic pump 400 is shown in FIG. 5 with yet further differing sources and destinations among the multiple coolant channels. FIG. 5 is an illustration of another example embodiment electromagnetic coolant pump 400 showing multiple channels in use around a single stator. FIG. 5 shows half of pump 400 in internal cross-section of an axial-radial plane, with black arrows 401 indicating coolant drive direction, and white arrows 402 indicating examples of heat transport in pump 400.

As shown in FIG. 5, primary coolant channel 430 may flow vertically past stator 416 and coils 406 therein with insulation 417. For example, primary coolant channel 430 may pull coolant from a cold pool and deliver the coolant to a plenum or vice versa. Stator 416 and/or magnetic material 415 may drive coolant 401 under a permanent and/or induced magnetic field, either upward or downward in primary coolant channel 430. Of course, any other coolant sources and destinations may be used with example embodiment pump 400, depending on location and any other delivery structures attached to channel 430.

Secondary coolant channel 431 may loop vertically on another side of stator 416 and coils 406 with insulation 417. For example, secondary coolant channel 431 may pull coolant and deliver the coolant back to a same source through casing 450, such as a cold pool. Stator 416 and/or magnetic material 415 may drive coolant 401 under a permanent and/or induced magnetic field, either upward or downward in secondary coolant channel 431. Of course, any other coolant sources and destinations may be used with example embodiment pump 400, depending on location and any other delivery structures attached to channel 431.

Because coolant 401 may flow in close proximity to both sides of coils 406, such as if channels 430 and 431 are directly adjacent to stator 416 and/or insulation 417, heat transfer 402 may occur from both ends of coils 406 to coolant 401. This reduces maximum temperature developed in coils 406 and insulation 417 separating coils 406 from stator 416, potentially extending the life and performance of insulation 417 and thus pump 400. Although primary coolant channel 430 may have a larger internal cross section than secondary channel 431, it is understood that because pump 400 may be symmetric about its vertical axis, these channels may be continuously annular, such that secondary channel 431 may have an equal or greater flow volume to primary channel 401 due to the larger radii. Secondary channel 431 may not displace wiring, sensors, or other internals of casing 450 by being positioned against stator 416; rather, any additional components for pump 400 may be positioned inside casing 450 outside of secondary channel 431 without change in operation or requiring any additional volume in pump 400.

Pumps 100-400 may use any materials compatible with an operating nuclear reactor environment, including radiation-resilient materials that maintain their physical characteristics when exposed to high-temperature fluids, liquid metals, and radiation without substantially changing in physical properties, such as becoming substantially radioactive, melting, brittling, retaining/adsorbing radioactive particulates, etc. For example, ceramics or metals such as stainless steels and iron alloys, zirconium alloys, etc., including austenitic stainless steels 304 or 316, XM-19, Alloy 600, etc., are useable for various pump components including those that may touch liquid coolant at several hundred degrees Celsius. Similarly, direct connections between distinct parts and all other direct contact points may be lubricated, insulated, and/or fabricated of alternating or otherwise compatible materials to prevent seizing, fouling, metal-on-metal reactions, conductive heat loss, etc.

Some example embodiments and methods thus being described, it will be appreciated by one skilled in the art that examples may be varied through routine experimentation and without further inventive activity. For example, although some types of control rod drives found in commercial nuclear power plants are the target of some example embodiments and methods, it is understood that other control elements are useable with example embodiments and methods. Variations are not to be regarded as departure from the spirit and scope of the example embodiments, and all such modifications as would be obvious to one skilled in the art are intended to be included within the scope of the following claims.

The invention claimed is:

1. An electromagnetic pump for driving a fluid providing enhanced cooling, the pump comprising:

a primary channel configured to receive the fluid and expel the fluid from the pump;

an electrical coil around the primary channel and configured to develop a magnetic field in the primary channel;

electrical insulation about the electrical coil; and a secondary channel configured to receive the fluid and expel the fluid from the pump, wherein the first and the second channels are annular about a vertical axis of the pump and nested radially, wherein the coil is configured to develop the magnetic field to drive the fluid in the same direction through the channels, and wherein the insulation is radially between the primary channel and the electrical coil so as to sink heat from the insulation to the fluid in the primary channel.

2. The pump of claim 1, wherein the secondary channel is positioned adjacent to the electrical coil, and wherein the electrical coil is configured to develop the magnetic field in the secondary channel.

3. The pump of claim 1, further comprising:

a stator between the primary channel and the secondary channel, wherein the coil passes through the stator and is insulated on all sides by the insulation, and wherein the stator is configured to generate the magnetic field through induction.

4. The pump of claim 3, wherein the pump includes a plurality of the stators and a plurality of the coils within the stators, wherein the primary channel passes adjacent to a first side of one of the stators and the secondary channel passes adjacent to a second side of the one of the stators, and wherein the first side and the second side are opposite each other on the one of the stators.

5. The pump of claim 1, further comprising:

a casing forming the external surface of the pump, wherein the casing is configured to be immersed in liquid sodium over 300° C. without failure; and an inlet manifold directing the fluid into the casing.

6. The pump of claim 1, wherein the primary channel is parallel to and flows into the secondary channel to loop around the coil.

7. The pump of claim 1, wherein the primary channel shares no fluid source or destination with the secondary channel throughout the pump so as to be entirely separate from the secondary channel throughout the pump.

8. An electromagnetic pump for driving a fluid providing enhanced cooling, the pump comprising:

an electrical coil configured to develop a magnetic field that drives the fluid through the pump;

a plurality of fluid coolant channels surrounding the electrical coil, wherein the channels are electrically isolated from the coil and thermally and magnetically un-isolated from the coil such that the coil develops a magnetic driving field in and sinks heat to each of the plurality of channels when provided with an electrical current, wherein the channels are annular about a vertical axis of the pump and nested radially, wherein the coil is configured to develop the magnetic driving field to drive the fluid in the same direction through the channels, and wherein flow paths of the pump are shaped to reverse the direction of all of the fluid driven through the pump.

9. The pump of claim 8, further comprising:

electrical insulation on the coil, wherein the electrical insulation provides the electrical isolation from the channels and sinks heat to the channels.

10. The pump of claim 9, wherein the pump includes a plurality of the coils, the pump further comprising:

a stator through which the plurality of coils pass, wherein the stator is insulated from the coils by the insulation.

11. The pump of claim 8, wherein the plurality of channels are parallel and flow into one another to loop around the coil.

12. The pump of claim 8, further comprising:

electrical insulation on the electrical coil providing the electrical isolation, wherein the coil is between two of the fluid coolant channels in a radial direction, and wherein the electrical insulation is between the coil and the two of the channels in the radial direction.

13. A method of simultaneously driving a fluid with an electromagnetic pump and cooling the pump with the fluid, the method comprising:

inducing, with an electrical circuit, a magnetic field in a plurality of channels so as to drive the fluid in the channels, wherein the channels pass on different vertical sides of the circuit in the pump, wherein the channels are annular about a vertical axis of the pump and nested radially, and wherein the driving drives the fluid in the same direction through the channels; and transferring heat in a first line from the electrical circuit, through electrical insulation, and to a first of the channels in the pump, and in a second line from the electrical circuit, through the electrical insulation, and to a second of the channels in the pump.

14. The method of claim 13, wherein the fluid is liquid sodium, and wherein the pump is immersed in the liquid sodium.

15. The method of claim 14, wherein the liquid sodium is driven by the inducing so as to flow through a core of a liquid sodium nuclear reactor.

16. The pump of claim 13, wherein the plurality of channels each share no fluid source or destination with one another throughout the pump so as to be entirely separate throughout the pump.

* * * * *